United States Patent
Takahashi et al.

(10) Patent No.: US 11,264,889 B2
(45) Date of Patent: Mar. 1, 2022

(54) ELECTRIC-POWER CONVERSION APPARATUS

(71) Applicant: Mitsubishi Electric Corporation, Tokyo (JP)

(72) Inventors: Hajime Takahashi, Tokyo (JP); Toshikazu Takagi, Tokyo (JP)

(73) Assignee: Mitsubishi Electric Cornoration, Tokyo (JP)

( * ) Notice: Subject to any disclaimer, the term of this patent is extended or adjusted under 35 U.S.C. 154(b) by 46 days.

(21) Appl. No.: 16/832,262

(22) Filed: Mar. 27, 2020

(65) Prior Publication Data

US 2020/0389085 A1 Dec. 10, 2020

(30) Foreign Application Priority Data

Jun. 6, 2019 (JP) .............................. JP2019-105880

(51) Int. Cl.
*H02M 1/32* (2007.01)
*H02M 3/335* (2006.01)
*H02M 1/08* (2006.01)
*H02M 1/00* (2006.01)

(52) U.S. Cl.
CPC .............. *H02M 1/32* (2013.01); *H02M 1/08* (2013.01); *H02M 3/33569* (2013.01); *H02M 1/0009* (2021.05); *H02M 1/327* (2021.05)

(58) Field of Classification Search
CPC ......... H02M 3/33592; H02M 3/33576; H02M 1/08; H02M 3/33553
See application file for complete search history.

(56) References Cited

U.S. PATENT DOCUMENTS 3,989,995 A * 11/1976 Peterson ........... H02M 3/33553
363/19
4,499,530 A * 2/1985 Onda .................. H02M 3/3385
363/17

(Continued)

FOREIGN PATENT DOCUMENTS

JP 2001-25238 A 1/2001
JP 2006-296159 A 10/2006

(Continued)

OTHER PUBLICATIONS

Notification of reasons for refusal dated Jul. 28, 2020 from the Japanese Patent Office in Application No. 2019-105880.

*Primary Examiner* — Kyle J Moody
(74) *Attorney, Agent, or Firm* — Sughrue Mion, PLLC; Richard C. Turner (57) ABSTRACT

There is provided an electric-power conversion apparatus that can protect semiconductor switching devices in accordance with the ambient temperature. The electric-power conversion apparatus includes a comparator that generates an output based on a comparison between the output of a sensor and a threshold value, a reference voltage circuit that produces the threshold value, and a control circuit that is configured in such a way as to be able to stop operation of a main circuit, based on the output of the comparator; the reference voltage circuit is configured in such a way as to change the threshold value in accordance with an ambient temperature under which semiconductor switching devices are laid.

16 Claims, 9 Drawing Sheets

(56) References Cited

U.S. PATENT DOCUMENTS

| | | | | |
|---|---|---|---|---|
| 4,937,727 | A * | 6/1990 | Leonardi | H02M 3/33523 363/97 |
| 5,726,869 | A * | 3/1998 | Yamashita | H02M 3/33592 363/21.06 |
| 6,522,560 | B1 * | 2/2003 | Lin | H02M 3/33592 363/89 |
| 10,281,941 | B2 * | 5/2019 | Mori | H02H 3/08 |
| 2006/0176043 | A1 | 8/2006 | Makino et al. | |
| 2007/0014133 | A1 * | 1/2007 | Shao | H02H 7/1252 363/52 |
| 2015/0370279 | A1 | 12/2015 | Akahane | |
| 2017/0040979 | A1 * | 2/2017 | Sakata | G01K 7/00 |
| 2017/0346405 | A1 * | 11/2017 | Lin | H02M 3/33507 |
| 2020/0091826 | A1 * | 3/2020 | Yang | H02M 3/33592 |

FOREIGN PATENT DOCUMENTS

| | | |
|---|---|---|
| JP | 4603378 B2 | 12/2010 |
| JP | 5778022 B2 | 9/2015 |
| JP | 6061033 B2 | 1/2017 |

\* cited by examiner

ELECTRIC-POWER CONVERSION APPARATUS

BACKGROUND OF THE INVENTION

Field of the Invention

The present disclosure relates to an electric-power conversion apparatus.

Description of the Related Art

As is well known, in general, a semiconductor switching device to be utilized in an electric-power conversion apparatus such as AC/DC converters, DC/DC converters, or inverters are semiconductor switching devices such as MOSFETs (Metal Oxide Semiconductor Field Effect Transistors) or IGBTs (Insulated Gate Bipolar Transistors), which are utilized in the voltage range of 200[V] through 400[V]; however, each of those semiconductor switching devices have a characteristic that in general, the withstanding voltage thereof at a low temperature side is low.

Accordingly, in conventional electric-power conversion apparatuses, there are performed so-called temperature derating in which in consideration of the low-temperature-side withstanding voltage value of semiconductor switching devices, the value of a current to be applied in accordance with an ambient temperature is suppressed to the rated value or smaller, or semiconductor switching devices having a higher withstanding voltage is utilized in accordance with the low-temperature-side withstanding voltage value so that even at the low temperature side, protection of the semiconductor switching devices are established.

In addition, in conventional electric-power conversion apparatuses, in order to prevent inner semiconductor switching devices from being broken, there is provided a protection device based on a software breaking method utilizing software or protection devices based on a hardware breaking method utilizing hardware. In particular, as far as protection devices based on a hardware breaking method are concerned, it is required that before semiconductor switching devices in the main circuit of electric-power conversion apparatuses is broken, electric-power conversion operation of the electric-power conversion apparatus is stopped.

As conventional apparatus provided with a protection device based on a hardware breaking method, there exist, for example, apparatuses disclosed in Patent Documents 1 through 3. In a conventional vehicle power supply apparatus disclosed in Patent Document 1, a linear positive-temperature-coefficient device is utilized in a current detection unit; the linear positive-temperature-coefficient device is disposed in the vicinity of a semiconductor switch so as to be thermally coupled with the semiconductor switch; the temperature coefficient value of the device having a linear positive temperature coefficient is appropriately selected; thus, excessive-current protection characteristics utilized in an abnormality detection unit can appropriately be adjusted. It is alleged that in the vehicle power supply apparatus according to Patent Document 1, a backup control circuit can make electric-power supply redundant when a gate driver IC (Integrated Circuit) is stopped.

A conventional reference voltage circuit disclosed in Patent Document 2 is provided with a constant voltage circuit that includes a Zener diode and a bias current circuit connected in series with the Zener diode so as to make a constant current flow in the Zener diode and that is inserted between a reference electric potential and a power-source voltage so as to cause a predetermined breakdown voltage across the Zener diode; the conventional reference voltage circuit is also provided with a resistance voltage-division circuit that includes a first resistor and a second resistor, which are connected in series with each other, and that is connected in parallel with the Zener diode so as to divide the breakdown voltage caused across the Zener diode and to produce a reference voltage. It is alleged that the reference voltage circuit disclosed in Patent Document 2 makes it possible to stably produce a constant reference voltage, regardless of a fluctuation in the power-source voltage and a temperature change.

Moreover, in a conventional reference voltage circuit disclosed in Patent Document 3, at least four resistors are utilized and the characteristic of each of the resistors is adjusted so that the effect of a temperature change is accurately compensated and so that the effect of a fluctuation in the power-source voltage is compensated. It is alleged that the conventional reference voltage circuit disclosed in Patent Document 3 can output a stable reference voltage.

Prior Art Reference

Patent Document

[Patent Document 1] Japanese Patent No. 5778022
[Patent Document 2] Japanese Patent No. 6061033
[Patent Document 3] Japanese Patent No. 4603378

SUMMARY OF THE INVENTION

As described above, because conventional electric-power conversion apparatuses cannot appropriately protect semiconductor switching devices in accordance with the ambient temperature, temperature derating is performed or semiconductor switching devices having a higher withstanding voltage is utilized in accordance with the low-temperature-side withstanding voltage value so that even at the low temperature side, protection is established; thus, it is required that expensive semiconductor switching devices are selected.

Moreover, the conventional vehicle power supply apparatus disclosed in Patent Document 1 is configured in such a way as to detect the temperature in the immediate vicinity of a semiconductor switching device; however, because in the case where a semiconductor switching device such as a MOSFET is adopted, such a temperature-detection diode is not mounted in an ordinary semiconductor package, it is required that a special configuration is implemented. Furthermore, because no resistor is connected in series with a thermistor in the reference voltage circuit, the reference voltage becomes 0[V] when a short-circuit failure occurs in the thermistor and hence there is a possibility that the semiconductor switching device cannot be protected.

Moreover, each of the conventional reference voltage circuits disclosed in Patent Documents 2 and 3 is utilized in such a way that the temperature-voltage characteristic is cancelled so that the threshold value does not fluctuate in accordance with a change in the ambient temperature; however, because the threshold value does not fluctuate, it is required that temperature derating of a semiconductor switching device is adopted and that a semiconductor switching device that is more expensive and has a higher withstanding voltage is selected in accordance with a low-voltage-side withstanding voltage.

Furthermore, in the case of each of the conventional apparatuses disclosed in Patent Documents 1 through 3, the threshold value largely fluctuates when part of a mechanism added in order to correct or cancel the temperature-voltage characteristic fails, and hence there is a possibility that no appropriate protection can be implemented.

The present disclosure is to disclose a technology for solving the foregoing problems; the objective thereof is to provide an electric-power conversion apparatus that can protect a semiconductor switching device in accordance with the ambient temperature.

An electric-power conversion apparatus disclosed in the present disclosure includes
  a main circuit that operates in such a way as to drive a semiconductor switching device so as to perform electric-power conversion,
  a sensor that detects an electric quantity at a predetermined portion of the main circuit and then outputs an output corresponding to the detected electric quantity,
  a comparator that generates an output based on a comparison between the output of the sensor and a threshold value,
  a reference voltage circuit that produces the threshold value, and
  a control circuit that is configured in such a way as to stop operation of the main circuit, based on the output of the comparator; the electric-power conversion apparatus is characterized in that the reference voltage circuit is configured in such a way as to change the threshold value in accordance with an ambient temperature under which the semiconductor switching device is laid.

An electric-power conversion apparatus disclosed in the present disclosure includes
  a main circuit that operates in such a way as to drive a semiconductor switching device so as to perform electric-power conversion,
  a sensor that detects an electric quantity at a predetermined portion of the main circuit and then outputs an output corresponding to the detected electric quantity,
  a sensor output correction circuit that corrects the output of the sensor,
  a comparator that generates an output based on a comparison between the output of the sensor output correction circuit and a threshold value, and
  a control circuit that is configured in such a way as to stop operation of the main circuit, based on the output of the comparator; the electric-power conversion apparatus is characterized in that the sensor output correction circuit is configured in such a way as to correct the output of the sensor in accordance with an ambient temperature under which the semiconductor switching device is laid.

An electric-power conversion apparatus disclosed in the present disclosure includes
  a main circuit that operates in such a way as to drive a semiconductor switching device so as to perform electric-power conversion,
  a sensor that detects an electric quantity at a predetermined portion of the main circuit and then outputs an output corresponding to the detected electric quantity,
  a comparator that generates an output based on a comparison between the output of the sensor and a threshold value,
  a reference voltage circuit that produces the threshold value, and
  a control circuit that is configured in such a way as to stop operation of the main circuit, based on the output of the comparator; the reference voltage circuit is configured in such a way as to change the threshold value in accordance with an ambient temperature under which the semiconductor switching device is laid. As a result, because the semiconductor switching device can be protected in accordance with the ambient temperature, it is not required that a semiconductor switching device having a higher withstanding voltage is utilized in accordance with a low-voltage-side withstanding voltage; thus, an inexpensive semiconductor switching device can be selected.

An electric-power conversion apparatus disclosed in the present disclosure includes
  a main circuit that operates in such a way as to drive a semiconductor switching device so as to perform electric-power conversion,
  a sensor that detects an electric quantity at a predetermined portion of the main circuit and then outputs an output corresponding to the detected electric quantity,
  a sensor output correction circuit that corrects the output of the sensor,
  a comparator that generates an output based on a comparison between the output of the sensor output correction circuit and a threshold value, and
  a control circuit that is configured in such a way as to stop operation of the main circuit, based on the output of the comparator; the sensor output correction circuit is configured in such a way as to correct the output of the sensor in accordance with an ambient temperature under which the semiconductor switching device is laid. As a result, because the semiconductor switching device can be protected in accordance with the ambient temperature, it is not required that a semiconductor switching device having a higher withstanding voltage is utilized in accordance with a low-voltage-side withstanding voltage; thus, an inexpensive semiconductor switching device can be selected.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
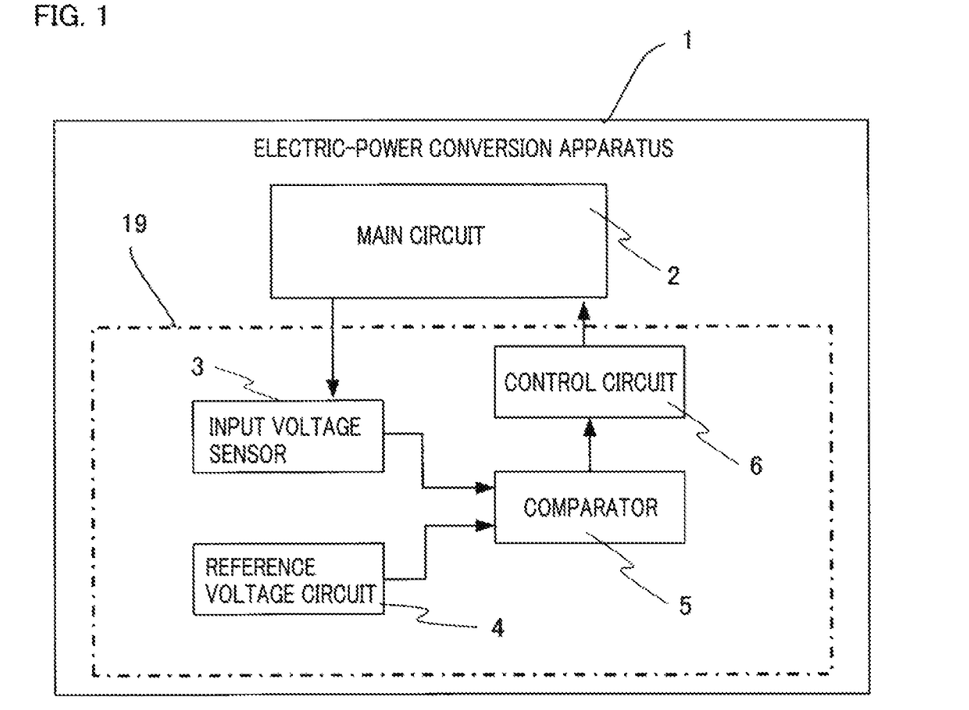
FIG. 1 is a block diagram representing an electric-power conversion apparatus according to Embodiment 1.

Hereinafter, an electric-power conversion apparatus according to Embodiment 1 will be explained with reference to the drawings. FIG. 1 is a block diagram representing an electric-power conversion apparatus according to Embodiment 1. In FIG. 1, an electric-power conversion apparatus 1 is provided with a main circuit 2 and an excessive-voltage protection mechanism 19. The excessive-voltage protection mechanism 19 is provided with a control circuit 6, an input voltage sensor 3, a reference voltage circuit 4, and a comparator 5.

As described later, the main circuit 2 as a Powerplant is configured with a DC/DC converter having constituent members including semiconductor switching devices such as MOSFETs or IGBTs, a transformer, coils, rectifier diodes, a capacitor, and the like. In Embodiment 1, the electric-power conversion apparatus 1 has the main circuit 2 configured with a DC/DC converter; however, the main circuit 2 may be configured with a converter or an inverter formed of a bridge circuit having semiconductor switching devices such as a MOSFET or an IGBT, a smoothing capacitor, and the like.

The control circuit 6 is configured in such a way as to control the semiconductor switching devices as a constituent member of the main circuit 2 and in such a way as to be able to stop the operation of the main circuit 2, based on the output of the comparator 5, or to be able to restart the operation thereof from a stop condition. The input voltage sensor 3 as a sensor detects a physical quantity at a predetermined circuit portion of the main circuit 2 and outputs a sensor output corresponding to the detected physical quantity. In Embodiment 1, the input voltage sensor 3 is configured in such a way as to detect a voltage as the physical quantity; however, it may be allowed that a current or an ambient temperature under which the semiconductor switching devices are laid is detected.

An ordinary sensor has a linear positive characteristic in which the output linearly increases in response to an increase in the input as a physical quantity to be detected, has a linear negative characteristic in which the output linearly decreases in response to an increase in the input, or has a nonlinear characteristic in which the output nonlinearly changes in response to an increase in the input; in Embodiment 1, for the sake of brevity, it is assumed that the input voltage sensor 3 has a linear negative characteristic; however, the input voltage sensor 3 may has a linear positive characteristic or a nonlinear characteristic.

The reference voltage circuit 4 is a circuit that produces a threshold value for performing protection operation based on hardware breaking of the main circuit 2; the reference voltage circuit 4 is configured in such a way as to make the threshold value fluctuate in accordance with the temperature of the atmosphere (hereinafter, referred to as the ambient temperature) under which the semiconductor switching devices are laid. The threshold value is set in such a way as not to become the maximum rating of the semiconductor switching devices, which is a constituent member of the main circuit 2, even when, for example, the bus voltage increases due to a load dump or the like and hence conversion operation by the main circuit 2 causes a surge voltage, a ripple voltage, or the like to occur.

Figure 2:
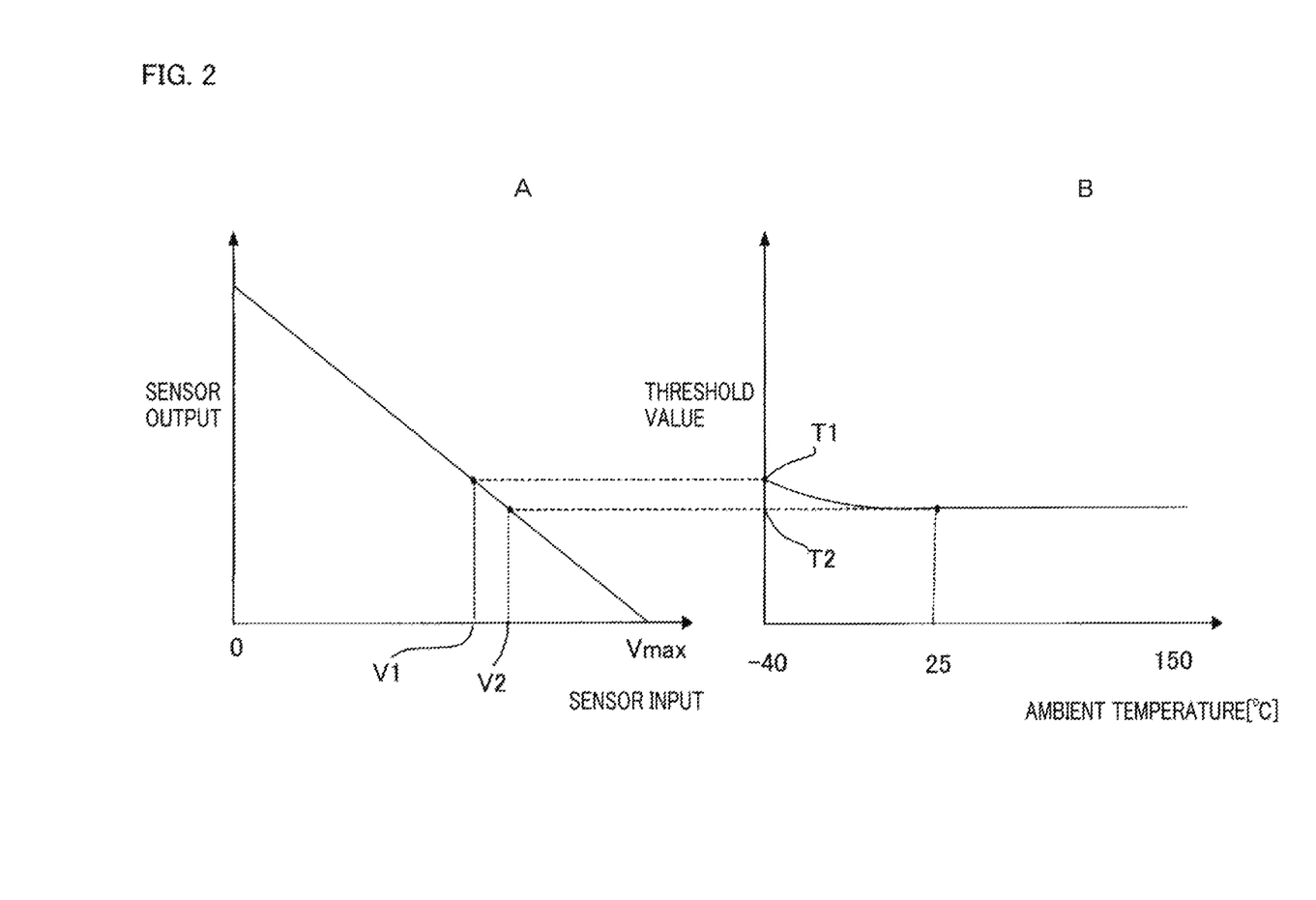
FIG. 2 is a set of explanatory graphs representing the basic principal of the electric-power conversion apparatus according to Embodiment 1.

FIG. 2 is a set of explanatory graphs representing the basic principal of the electric-power conversion apparatus according to Embodiment 1. The graph A in FIG. 2 represents an output characteristic chart of the input voltage sensor 3; the abscissa denotes the input voltage [V] as a sensor input; the ordinate denotes the output voltage [V] as a sensor output. As represented by the graph A in FIG. 2, the input voltage sensor 3 has an output characteristic, which is a linear negative characteristic.

The graph B in FIG. 2 is a characteristic chart representing the relationship between the threshold value to be produced by the reference voltage circuit 4 and the ambient temperature; the ordinate denotes the threshold value, and the abscissa denotes the ambient temperature[° C.]. As represented by the graph B in FIG. 2, with regard to the threshold value for protecting the semiconductor switching devices, the reference voltage circuit 4 is configured in such a way that a threshold value T1 at −40[° C.], which is the possible lowest ambient temperature, is set as the maximum threshold value and in such a way that from the ambient temperature −40[° C.] to the ambient temperature 25[° C.], the threshold value is made to gradually decrease from the threshold value T1 to a threshold value T2 as the ambient temperature rises. When the ambient temperature exceeds 25[° C.], the threshold value to be produced by the reference voltage circuit 4 becomes a constant value, i.e., the threshold value T2.

In FIG. 1, the comparator 5 compares the output of the input voltage sensor 3 with a threshold value from the reference voltage circuit 4; in the case where the output of the sensor 3 is the same as or smaller than the threshold value produced by the reference voltage circuit 4, it is determined that the voltage at the predetermined portion of the main circuit 2 is abnormal; then, the abnormality in the main circuit 2 is transferred to the control circuit 6 at the poststage. In other words, as represented by the graphs A and B in FIG. 2, in the case where the ambient temperature is, for example, −40[° C.], the sensor output becomes the threshold value T1 or smaller when the sensor input is V1[V] or larger; thus, the comparator 5 determines that the voltage at the foregoing portion of the main circuit 2 is abnormal and then transfers the abnormality in the main circuit 2 to the control circuit 6 at the poststage. In the case where the ambient temperature is, for example, the same as or higher than 25[° C.], the sensor output becomes the threshold value T2 or smaller when the sensor input is V2 [V] or larger; thus, the comparator 5 determines that the voltage at the foregoing portion of the main circuit 2 is abnormal and then transfers the abnormality in the main circuit 2 to the control circuit 6 at the poststage.

As described above, in the reference voltage circuit 4, the threshold value is made to gradually decrease from T1 to T2 as the ambient temperature rises in the ambient-temperature range from −40[° C.] to 25[° C.]; in contrast, the threshold value is made to gradually increase from T2 to T1 as the ambient temperature falls. Thus, in the case where the ambient temperature is, for example, 25[° C.], which is higher than −40[° C.], the threshold value becomes T2; then, when the output of the input voltage sensor 3 is the same as or smaller than the threshold value T2, the comparator 5 determines that the voltage at the circuit portion of the main circuit 2 is abnormal and then transfers the abnormality in the main circuit 2 to the control circuit 6 at the poststage.

In other words, because when the ambient temperature is the same as or lower than 25[° C.], the semiconductor switching devices are protected at a voltage lower than that at normal time, even the semiconductor switching devices having a low withstanding voltage at the low temperature side is not broken.

When receiving a signal, from the comparator 5, that indicates the abnormality in the main circuit, the control circuit 6 stops the operation of the main circuit 2. When while the operation of the main circuit 2 is stopped, the output of the comparator 5 indicates the normality of the main circuit 2, the control circuit 6 restarts the operation of the main circuit 2.

As described above, because in the electric-power conversion apparatus according to Embodiment 1, the threshold value for determining the abnormality in the main circuit changes in accordance with the ambient temperature around the semiconductor switching devices, they are not required that as in conventional apparatuses, temperature derating of semiconductor switching devices is performed and semiconductor switching devices having a higher withstanding voltage is utilized in accordance with a low-voltage-side withstanding voltage value so that low-temperature-side protection is established; therefore, inexpensive semiconductor switching devices can be selected.

Figure 3:
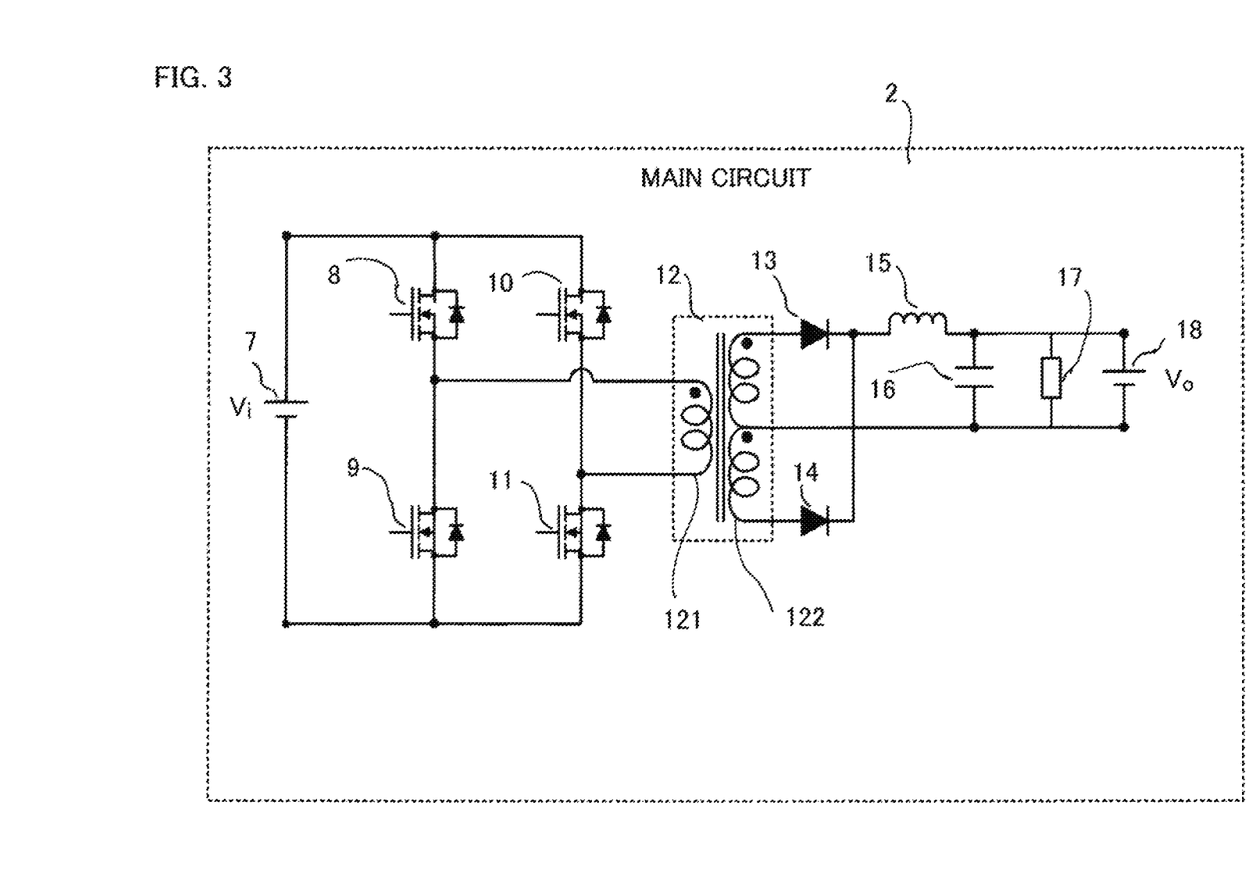
FIG. 3 is a circuit diagram of the main circuit of the electric-power conversion apparatus according to Embodiment.

FIG. 3 is a circuit diagram of the main circuit of the electric-power conversion apparatus according to Embodiment; FIG. 3 represents a case where the main circuit 2 is configured with a DC/DC converter. In FIG. 3, the main circuit 2 of the DC/DC converter is configured with elements from a high-voltage battery 7 having a voltage Vi in the input portion to a load 17 and a low-voltage battery 18 having a voltage Vo at the output side. The post stage of the high-voltage battery 7 is connected with four semiconductor switching devices, which are MOSFETs, i.e., a first semiconductor switching device 8, a second semiconductor switching device 9, a third semiconductor switching device 10, and a fourth semiconductor switching device 11.

The connection point between the drain of the first semiconductor switching device 8 and the source of the second semiconductor switching device 9 is connected with one end of a primary winding 121 of a transformer 12; the connection point between the drain of the third semiconductor switching device 10 and the source of the fourth semiconductor switching device 11 is connected with the other end of the primary winding 121 of the transformer 12.

The post stage of a secondary winding 122 of the transformer 12 is connected with the anode of a first rectifier diode 13 and the anode of a second rectifier diode 14. The respective cathodes of the first rectifier diode 13 and the second rectifier diode 14 are connected with a smoothing reactor 15. The post stage of the smoothing reactor 15 is connected with a smoothing capacitor 16, the load 17 at the output side, and the low-voltage battery 18.

The first semiconductor switching device 8, the second semiconductor switching device 9, the third semiconductor switching device 10, and the fourth semiconductor switching device 11 are on/off-driven by the control circuit 6 represented in FIG. 1. The first semiconductor switching device 8 and the fourth semiconductor switching device 11 are simultaneously on-driven or off-driven; the second semiconductor switching device 9 and the third semiconductor switching device 10 are simultaneously on-driven or off-driven.

When the first semiconductor switching device 8 and the fourth semiconductor switching device 11 are on-driven, the second semiconductor switching device 9 and the third semiconductor switching device 10 are off-driven; when the second semiconductor switching device 9 and the third semiconductor switching device 10 are on-driven, the first semiconductor switching device 8 and the fourth semiconductor switching device 11 are off-driven.

When the first semiconductor switching device 8 and the fourth semiconductor switching device 11 are on-driven, a secondary current flows in a closed circuit including one part of the secondary winding 122 of the transformer, the first rectifier diode 13, the smoothing reactor 15, the smoothing capacitor 16, the load 17, and the low-voltage battery 18. In contrast, when the second semiconductor switching device 9 and the third semiconductor switching device 10 are on-driven, a secondary current flows in a closed circuit including the other part of the secondary winding 122 of the transformer, the second rectifier diode 14, the smoothing reactor 15, the smoothing capacitor 16, the load 17, and the low-voltage battery 18.

As described above, the pair of the first semiconductor switching device 8 and the fourth semiconductor switching device 11 and the pair of the second semiconductor switching device 9 and the third semiconductor switching device 10 are driven in an alternate and contrary manner, so that electric-power conversion is performed between the input-side high-voltage battery and the output-side low-voltage battery 18 and the load 17 is driven.

In Embodiment 1, there has been described, as an example, the case where the main circuit 2 of the electric-power conversion apparatus 1 is a DC/DC converter; however, as described above, the main circuit 2 may be either an AC/DC converter or an inverter; furthermore, each of the input and the load is not limited to a battery.

Figure 4:
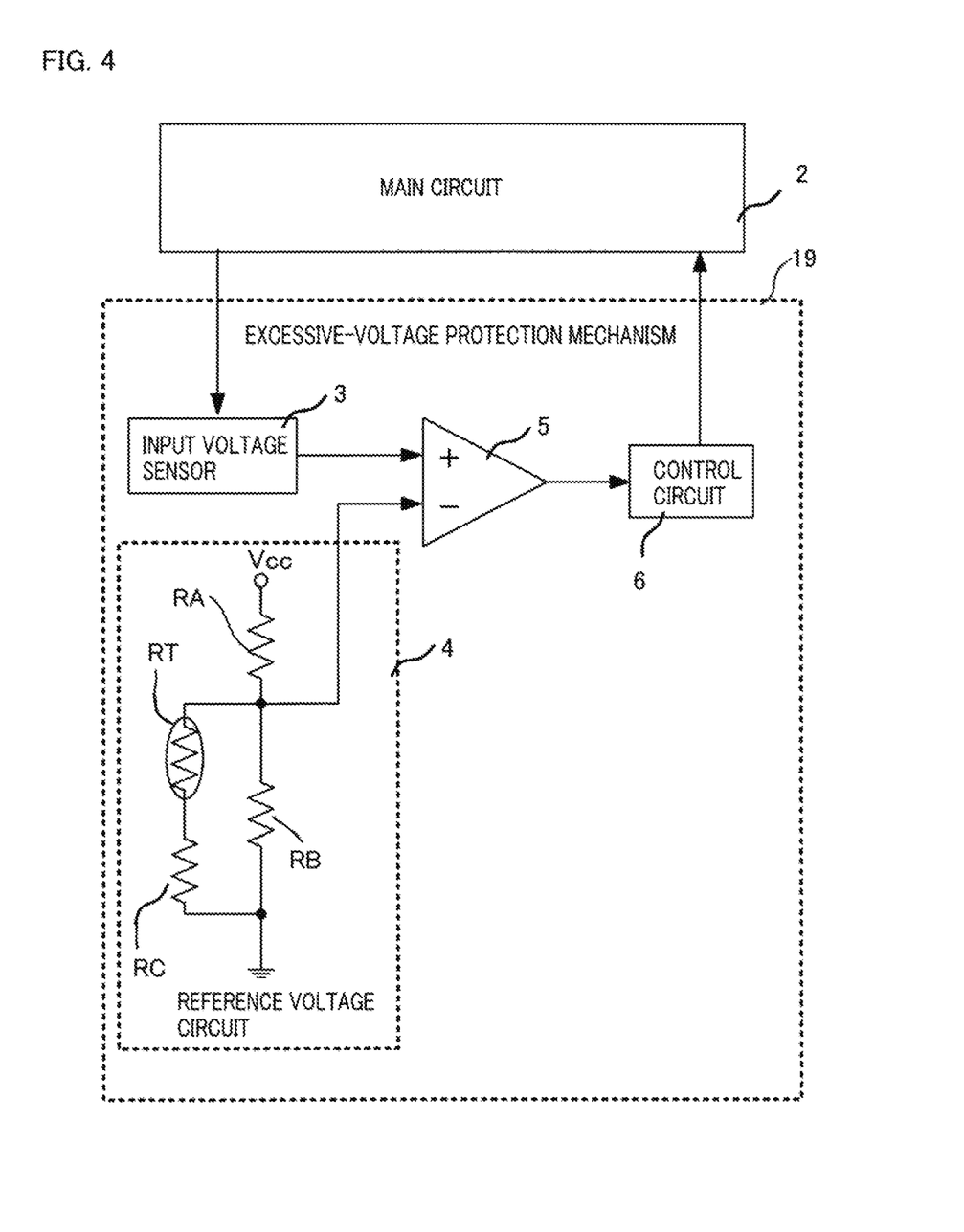
FIG. 4 is a configuration diagram representing part of the electric-power conversion apparatus according to Embodiment 1.

FIG. 4 is a configuration diagram representing part of the electric-power conversion apparatus according to Embodiment 1; the configuration diagram represents the details of the excessive-voltage protection mechanism 19. As represented also in FIG. 1, the excessive-voltage protection mechanism 19 is provided with the control circuit 6, the input voltage sensor 3, the reference voltage circuit 4, and the comparator 5.

The input voltage sensor 3 detects a voltage, as a physical quantity, between the high-voltage battery 7 of the main circuit 2 and the first semiconductor switching device 8 and then outputs a signal corresponding to the value of the detected voltage. As described above, the reference voltage circuit 4 produces a threshold value that fluctuates in accordance with the ambient temperature under which the semiconductor switching devices are laid. The comparator 5 compares the output of the input voltage sensor 3 with a threshold value from the reference voltage circuit 4.

When the output of the comparator 5 indicates an abnormality in the main circuit, the control circuit 6 stops the operation of the main circuit 2 so as to protect the first semiconductor switching device 8, the second semiconductor switching device 9, the third semiconductor switching device 10, and the fourth semiconductor switching device 11. When the output of the comparator 5 indicates the normality of the main circuit, the control circuit 6 makes the main circuit 2 operate.

The input voltage sensor 3 inputs its output, which corresponds to the value of the foregoing detected voltage, to the comparator 5 at the post stage. In this situation, as described above, the input voltage sensor 3 generates its output having a linear negative characteristic for a detected voltage as an input quantity.

The reference voltage circuit 4 has a first voltage dividing resistor RA, a second voltage dividing resistor RB connected in series with the first voltage dividing resistor RA, a resistor RC, and a thermistor RT connected in series with the resistor RC and having an NTC (Negative Temperature Coefficient) characteristic. The thermistor RT and the resistor RC that are connected in series with each other are connected in parallel with the second voltage dividing resistor RB.

Because the thermistor RT and the resistor RC that are connected in series with each other are connected in parallel with the second voltage dividing resistor RB, the threshold value having a characteristic represented in the foregoing graph B of FIG. 2 can be produced. The threshold value to be produced by the reference voltage circuit 4 fluctuates, as described above, in accordance with the ambient temperature, when the ambient temperature of the environment under which the semiconductor switching devices in the main circuit 2 are laid is, for example, in the range from −40[° C.] to 25[° C.]. In this situation, the threshold value to be produced by the reference voltage circuit 4 is set in such a way as not to become the maximum rating of the semiconductor switching devices, even when, for example, the bus voltage increases due to a load dump or the like and hence electric-power conversion operation by the main circuit 2 causes a surge voltage, a ripple voltage, or the like to occur.

The resistor RC has a resistance value that is more than one-digit times but less than double-digit times as large as the resistance value of the first voltage dividing resistor RA. As a result, the basic threshold value to be produced by the reference voltage circuit 4 is determined by the voltage division ratio based on the first voltage dividing resistor RA and the second voltage dividing resistor RB. Accordingly, even provided any one of the resistor RC and the thermistor RT fails, the additional-function fault due to the failure does not largely change the threshold value; thus, the effect at a time when the failure occurs can be reduced.

Each of the first voltage dividing resistor RA, the second voltage dividing resistor RB, and the resistor RC may be configured with two or more integrated resistor elements. This method can raise the degree of flexibility in setting of the threshold value.

The comparator 5 compares the output of the input voltage sensor 3 with a threshold value to be produced by the reference voltage circuit 4, determines whether the output of the input voltage sensor 3 is normal or abnormal, and then inputs a signal indicating the determination result to the control circuit 6. When the signal from the comparator 5 is a signal indicating that the output of the input voltage sensor 3 is abnormal, the control circuit 6 stops the operation of the main circuit 2; when the signal from the comparator 5 is a signal indicating that the output of the input voltage sensor 3 has returned to a value within the normal range, the control circuit 6 restarts the operation of the main circuit 2.

Because in the foregoing electric-power conversion apparatus according to Embodiment 1, the threshold value can be changed in accordance with the ambient temperature around the semiconductor switching devices, they are not required that as in conventional apparatuses, temperature derating of semiconductor switching devices are performed and semiconductor switching devices having a higher withstanding-voltage characteristic is utilized in accordance with a low-voltage-side withstanding voltage value so that low-temperature-side protection is established; therefore, inexpensive semiconductor switching devices can be selected.

Moreover, in the case of each of the conventional apparatuses disclosed in Patent Documents 1 through 3, the threshold value for protecting constituent members largely fluctuates when part of a mechanism added in order to correct or cancel the temperature-voltage characteristic fails, and hence there is a possibility that no protection of the constituent members can be implemented; however, in the electric-power conversion apparatus according to Embodiment 1 of the present disclosure, the basic threshold value to be produced by the reference voltage circuit 4 is determined by the voltage division ratio based on the first voltage dividing resistor RA and the second voltage dividing resistor RB; therefore, even provided any one of the resistor RC and the thermistor RT fails, the additional-function fault due to the failure does not largely change the threshold value; thus, the effect at a time when the failure occurs can be reduced.

Embodiment 2

Figure 5:
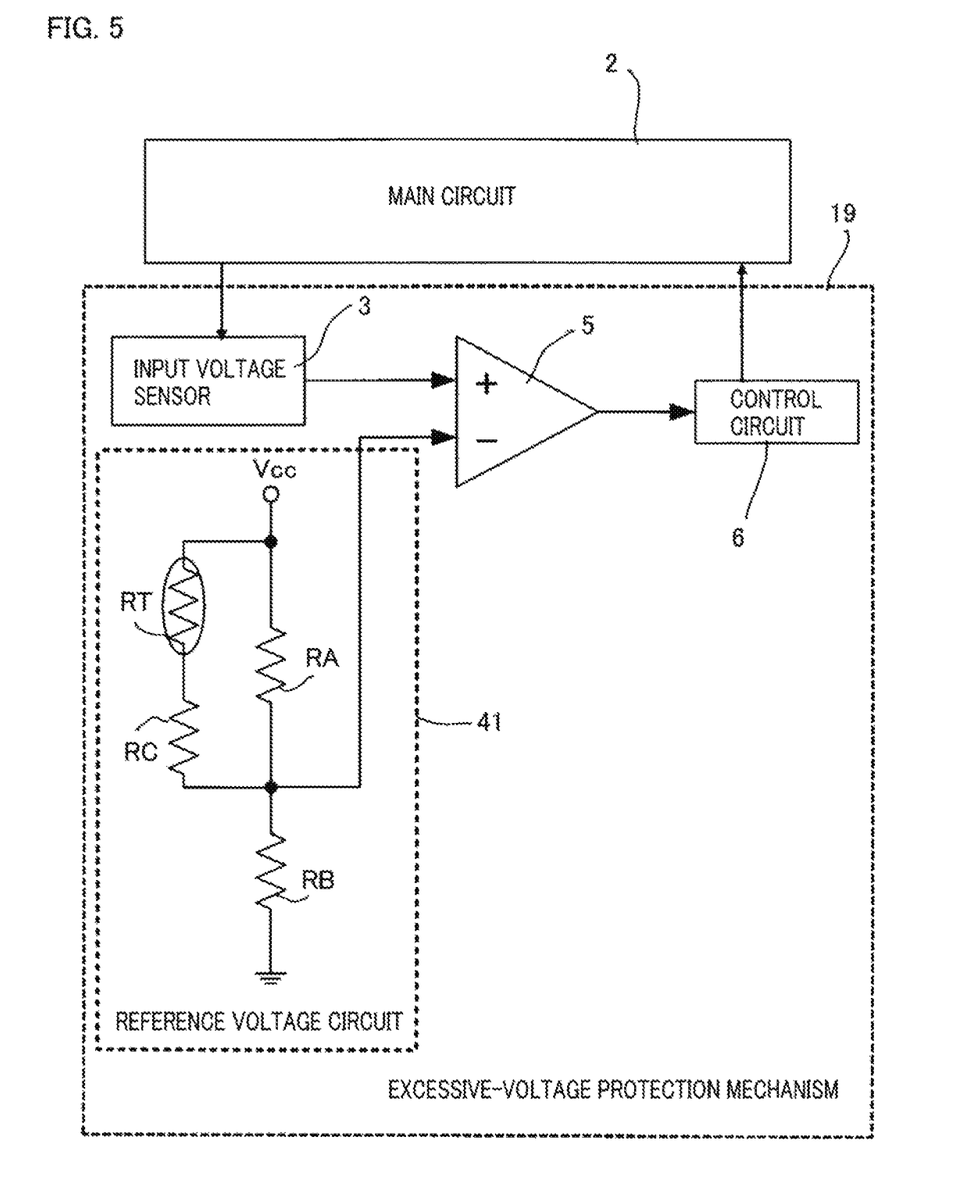
FIG. 5 is a configuration diagram representing part of an electric-power conversion apparatus according to Embodiment 2.

Next, an electric-power conversion apparatus according to Embodiment 2 will be explained. FIG. 5 is a configuration diagram representing part of the electric-power conversion apparatus according to Embodiment 2; the configuration diagram represents an excessive-voltage protection mechanism. As is the case with Embodiment 1, the basic configuration of the electric-power conversion apparatus according to Embodiment 2 is represented in FIGS. 1 and 2. In FIG. 5, a reference voltage circuit 41 has the first voltage dividing resistor RA, the second voltage dividing resistor RB, the resistor RC, and the thermistor RT connected in series with the resistor RC and having a PTC (Positive Temperature Coefficient) characteristic. The series circuit consisting of the thermistor RT and the resistor RC is connected in parallel with the first voltage dividing resistor RA.

In this situation, the resistor RC has a resistance value that is more than one-digit times but less than double-digit times as large as the resistance value of the first voltage dividing resistor RA. With such a configuration as described above, the basic threshold value is determined by the voltage division ratio based on the first voltage dividing resistor RA and the second voltage dividing resistor RB; accordingly, even provided any one of the resistor RC and the thermistor RT fails and hence the additional-function fault occurs, the threshold value does not change largely; thus, the effect at a time when the failure occurs can be reduced. The other configurations and operational actions are the same as those of the electric-power conversion apparatus according to Embodiment 1; Embodiment 2 has an effect the same as that of Embodiment 1.

Embodiment 3

Figure 6:
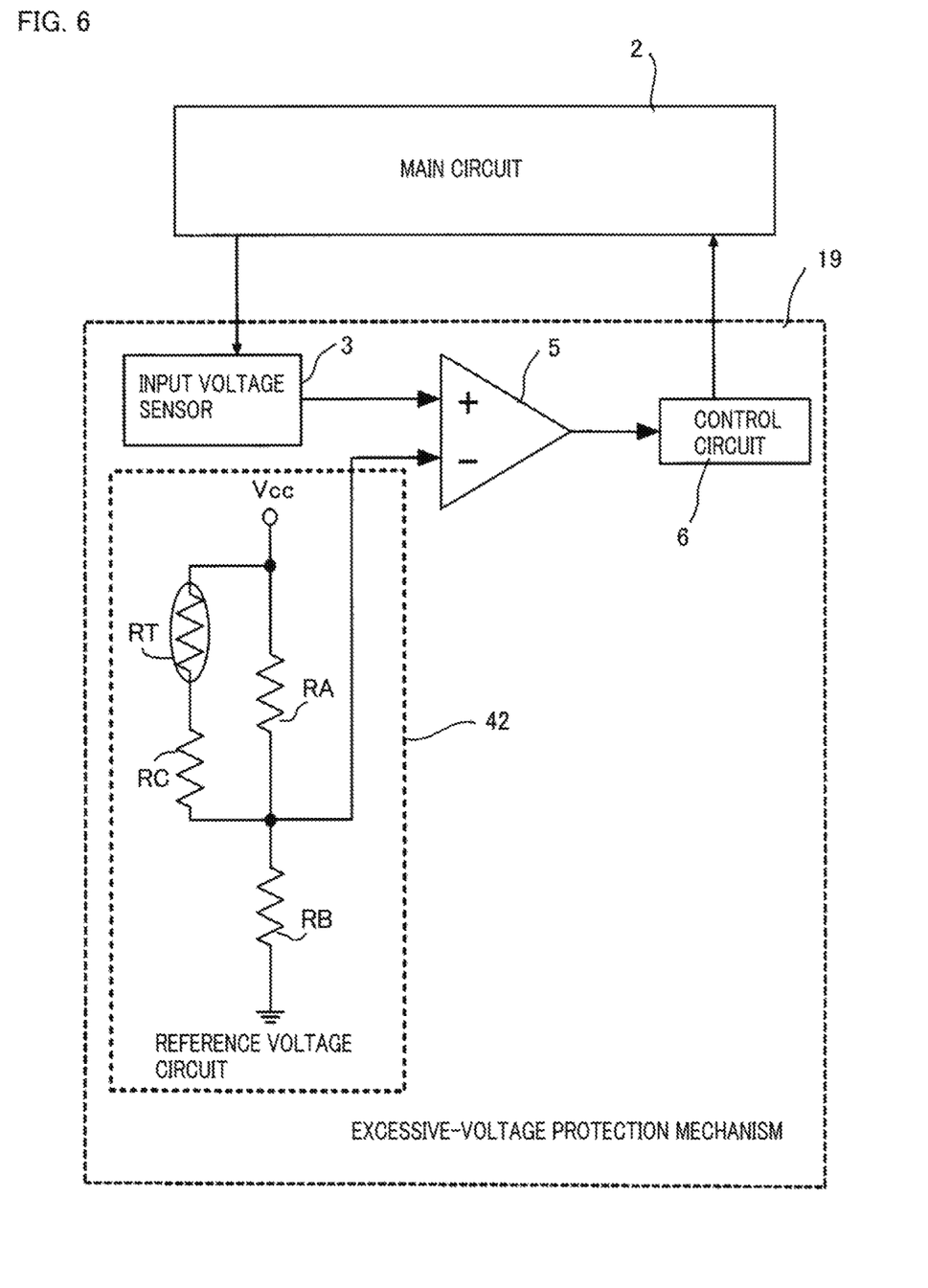
FIG. 6 is a configuration diagram representing part of an electric-power conversion apparatus according to Embodiment 3.

Next, an electric-power conversion apparatus according to Embodiment 3 will be explained. FIG. 6 is a configuration diagram representing part of the electric-power conversion apparatus according to Embodiment 3; the configuration diagram represents an excessive-voltage protection mechanism. As is the case with Embodiment 1, the basic configuration of the electric-power conversion apparatus according to Embodiment 3 is represented in FIG. 1. In FIG. 6, a reference voltage circuit 42 has the first voltage dividing resistor RA, the second voltage dividing resistor RB, the resistor RC, and the thermistor RT connected in series with the resistor RC and having a NTC characteristic; the series circuit consisting of the thermistor RT and the resistor RC is connected in parallel with the first voltage dividing resistor RA. The input voltage sensor 3 has an output characteristic, which is a linear positive characteristic.

Figure 7:
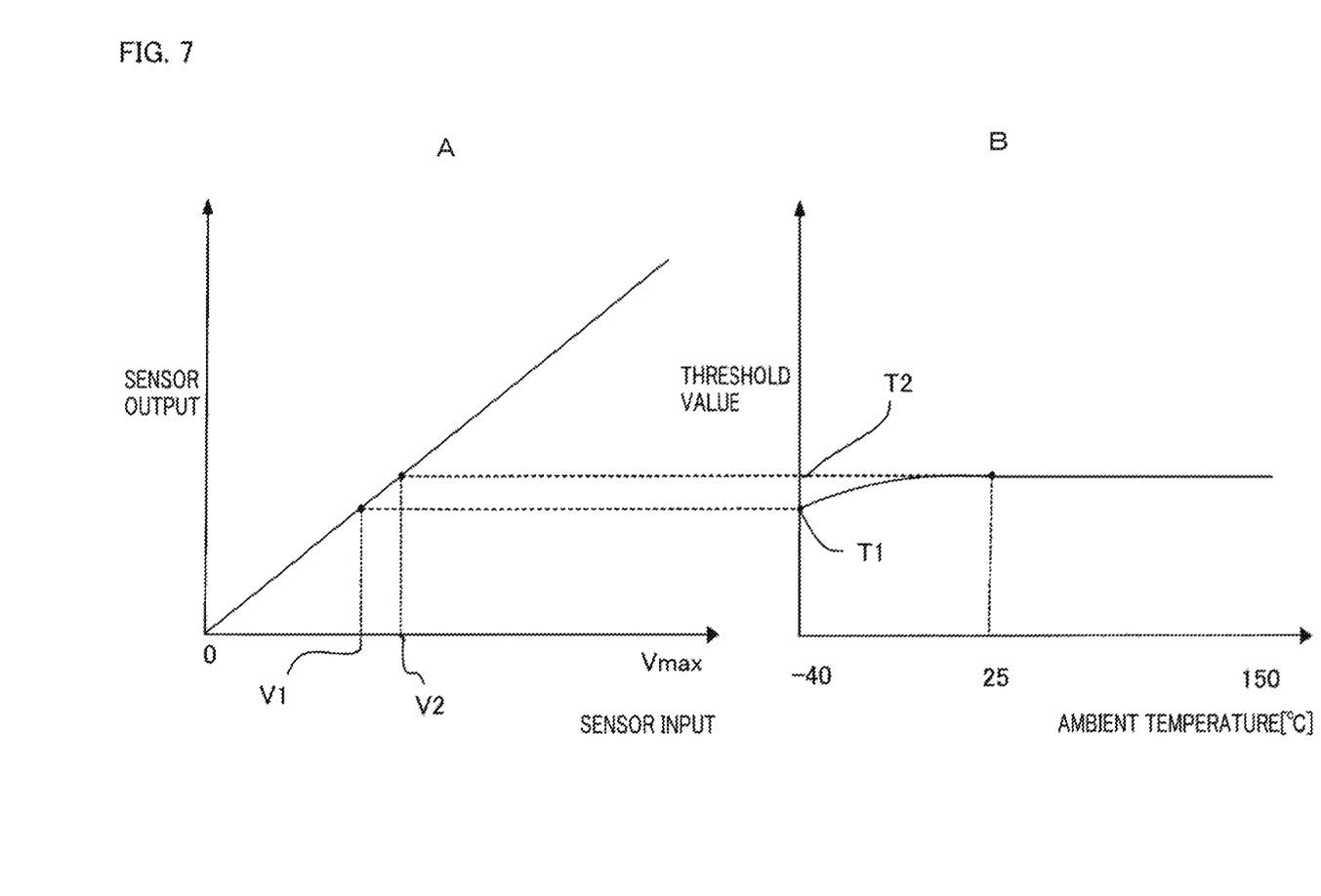
FIG. 7 is a set of explanatory graphs representing the basic principal of the electric-power conversion apparatus according to Embodiment 3.

FIG. 7 is a set of explanatory graphs representing the basic principal of the electric-power conversion apparatus according to Embodiment 3. The graph (A) in FIG. 7 represents an output characteristic chart of the input voltage sensor 3; the abscissa denotes the input voltage [V] as a sensor input; the ordinate denotes the output voltage [V] as a sensor output. As represented by the graph (A) in FIG. 7, the input voltage sensor 3 has an output characteristic, which is a linear positive characteristic.

The graph (B) in FIG. 7 is a characteristic chart representing the relationship between the threshold value to be produced by the reference voltage circuit 42 and the ambient temperature; the ordinate denotes the threshold value, and the abscissa denotes the ambient temperature[° C.]. As represented by the graph (B) in FIG. 7, with regard to the threshold value for protecting the semiconductor switching devices, the reference voltage circuit 42 is configured in such a way that a threshold value T1 at −40[° C.], which is the possible lowest ambient temperature, is set as the minimum threshold value and in such a way that from the ambient temperature −40[° C.] to the ambient temperature 25[° C.], the threshold value is made to gradually increase from the threshold value T1 to a threshold value T2 as the ambient temperature rises. When the ambient temperature exceeds 25[° C.], the threshold value to be produced by the reference voltage circuit 42 becomes a constant value, i.e., the threshold value T2.

The comparator 5 compares the output of the input voltage sensor 3 with a threshold value from the reference voltage circuit 42; in the case where the output of the sensor 3 is the same as or larger than the threshold value produced by the reference voltage circuit 42, it is determined that the voltage at the predetermined portion of the main circuit 2 is abnormal; then, the abnormality in the main circuit 2 is transferred to the control circuit 6 at the poststage. In other words, as represented by the graphs (A) and (B) in FIG. 7, in the case where the ambient temperature is, for example, −40[° C.], the operation of the main circuit 2 is stopped when the sensor input is the same as or larger than V1 [V], i.e., when the sensor output is the same as or larger than the threshold value T1, and hence the semiconductor switching devices are protected before being broken. In the case where the ambient temperature is, for example, the same as or higher than 25[° C.], the operation of the main circuit 2 is stopped when the sensor input is the same as or larger than V2 [V], i.e., when the sensor output is the same as or larger than the threshold value T2, and hence the semiconductor switching devices are protected before being broken.

As described above, in the ambient-temperature range from −40[° C.] to 25[° C.], the threshold value is made to gradually increase from T1 to T2 as the ambient temperature rises. In contrast, in the ambient-temperature range from −40[° C.] to 25[° C.], the reference voltage circuit 42 makes the threshold value gradually decrease from T2 to T1 as the ambient temperature falls. In other words, the reference voltage circuit 42 is configured in such a way as to change the threshold value in accordance with changes in the withstanding voltages, of constituent members such as the semiconductor switching devices, that change corresponding to the ambient temperature.

When receiving a signal, from the comparator 5, that indicates the abnormality in the main circuit, the control circuit 6 stops the operation of the main circuit 2. When while the operation of the main circuit 2 is stopped in such a manner, the main circuit 2 recovers from the foregoing abnormality and becomes normal, the comparator 5 outputs a signal indicating the normality of the main circuit 2 to the control circuit 6; as a result, the control circuit 6 restarts the operation of the main circuit 2.

Embodiment 3 makes it possible to obtain such a threshold-value characteristic as represented by the graph (B) in FIG. 7; thus, the threshold value from the reference voltage circuit fluctuates in accordance with the ambient temperature around the semiconductor switching devices in the main circuit 2. The threshold value to be produced by the reference voltage circuit 42 is set in such a way as not to become the maximum rating of the semiconductor switching devices, even when, for example, the bus voltage increases due to a load dump or the like and hence conversion operation by the main circuit causes a surge voltage or a ripple voltage.

In this situation, the resistor RC has a resistance value that is more than one-digit times but less than double-digit times as large as the resistance value of the first voltage dividing resistor RA. With such a configuration as described above, the basic threshold value is determined by the voltage division ratio based on the first voltage dividing resistor RA and the second voltage dividing resistor RB; accordingly, even provided any one of the resistor RC and the thermistor RT fails and hence the additional-function fault occurs, the threshold value does not change largely; thus, the effect at a time when the failure occurs can be reduced. The other configurations are the same as those of Embodiment 1; Embodiment 2 has an effect the same as that of Embodiment 1.

Embodiment 4

Figure 8:
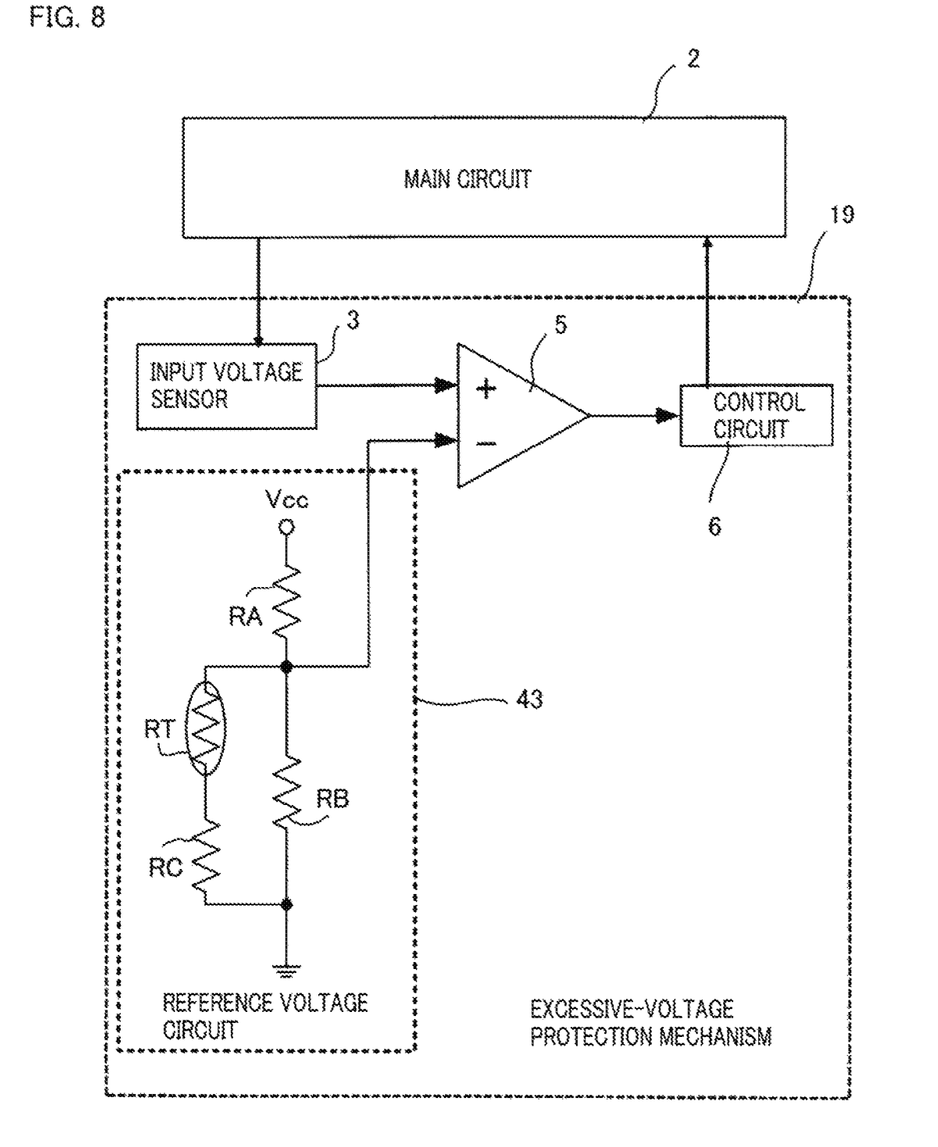
FIG. 8 is a configuration diagram representing part of an electric-power conversion apparatus according to Embodiment 4.

Next, an electric-power conversion apparatus according to Embodiment 4 will be explained. FIG. 8 is a configuration diagram representing part of the electric-power conversion apparatus according to Embodiment 4; the configuration diagram represents an excessive-voltage protection mechanism. As is the case with Embodiment 1, the basic configuration of Embodiment 4 is represented in FIG. 1. In FIG. 8, a reference voltage circuit 43 has the first voltage dividing resistor RA, the second voltage dividing resistor RB, the resistor RC, and the thermistor RT connected in series with the resistor RC and having a PTC characteristic; the series circuit consisting of the thermistor RT and the resistor RC is connected in parallel with the second voltage dividing resistor RB.

Embodiment 4 makes it possible to obtain such a characteristic as represented by foregoing FIG. 7; thus, the threshold value produced by the reference voltage circuit 43 fluctuates in accordance with the ambient temperature around the main circuit 2. The threshold value to be produced by the reference voltage circuit 43 is set in such a way as not to become the maximum rating of the semiconductor switching devices, even when, for example, the bus voltage increases due to a load dump or the like and hence conversion operation by the main circuit 2 causes a surge voltage, a ripple voltage, or the like to occur.

In this situation, the resistor RC has a resistance value that is one-digit to two-digit times as large as the resistance value of the second voltage dividing resistor RB. With such a configuration as described above, the basic threshold value is determined by the voltage division ratio based on the first voltage dividing resistor RA and the second voltage dividing resistor RB; accordingly, even provided any one of the resistor RC and the thermistor RT fails and hence additional-function fault occurs, the threshold value does not change largely; thus, the effect at a time when the failure occurs can be reduced. The other configurations are the same as those of Embodiment 1; Embodiment 2 has an effect the same as that of Embodiment 1.

Embodiment 5

Figure 9:
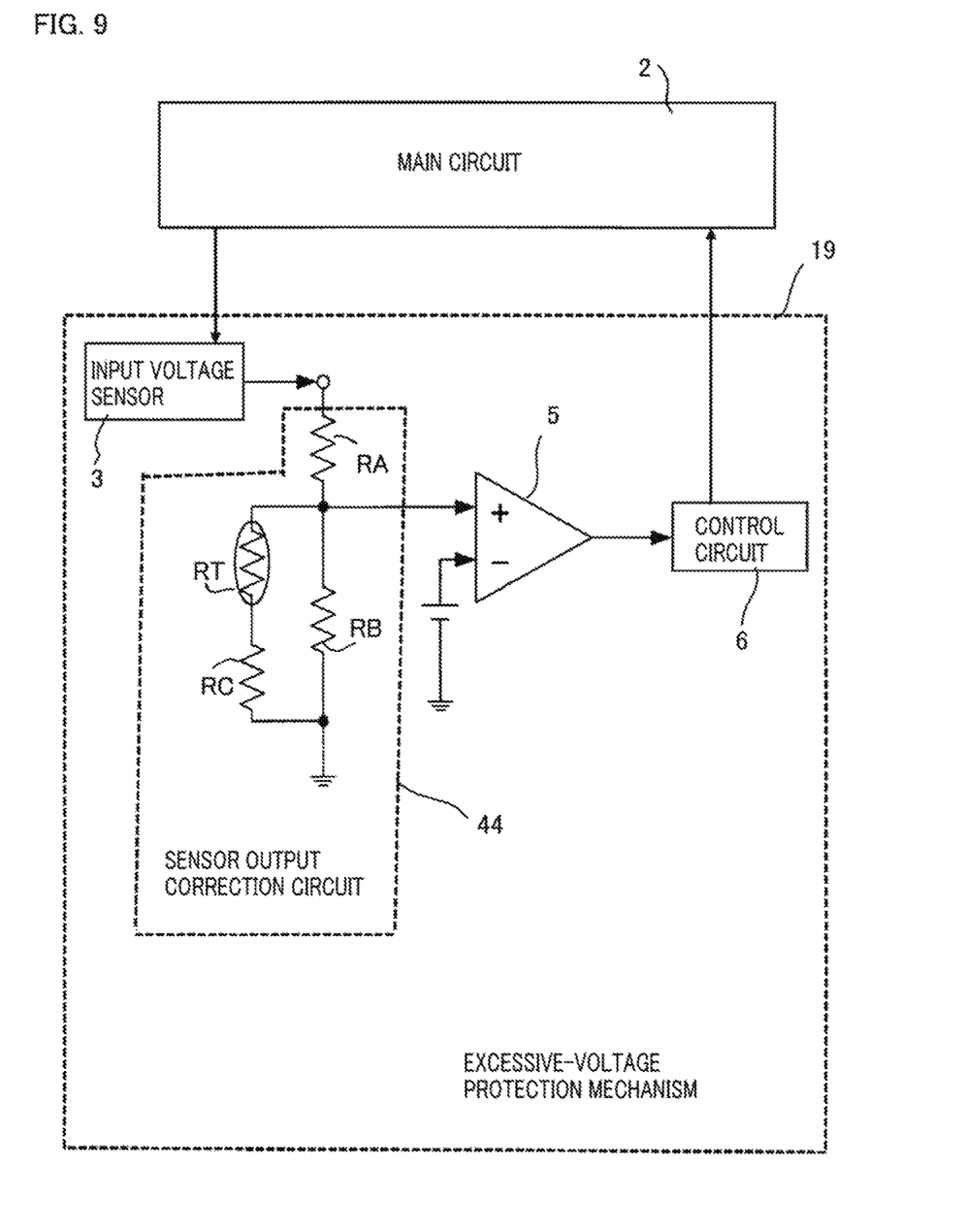
FIG. 9 is a configuration diagram representing part of an electric-power conversion apparatus according to Embodiment 5.

Next, an electric-power conversion apparatus according to Embodiment 5 will be explained. FIG. 9 is a configuration diagram representing part of the electric-power conversion apparatus according to Embodiment 5; the configuration diagram represents an excessive-voltage protection mechanism. In each of foregoing Embodiments 1 through 4, the first voltage dividing resistor RA, the second voltage dividing resistor RB, the resistor RC, and the thermistor RT are added to the reference voltage circuit so that the threshold value to be produced by the reference voltage circuit is made to fluctuate in accordance with the ambient temperature; however, in Embodiment 5, the reference electric potential to be inputted to the comparator 5 is made to be a fixed value, and a sensor output correction circuit 44 including the first voltage dividing resistor RA, the second voltage dividing resistor RB, the resistor RC, and the thermistor RT is added to the output of the input voltage sensor 3.

The sensor output correction circuit 44 has the first voltage dividing resistor RA, the second voltage dividing resistor RB, the resistor RC, and the thermistor RT connected in series with the resistor RC; the series circuit consisting of the thermistor RT and the resistor RC is connected in parallel with the second voltage dividing resistor RB. The sensor output correction circuit 44 has, for example, a function the same as that of the reference voltage circuit 43 of the electric-power conversion apparatus according to Embodiment 4, represented in foregoing FIG. 8, generates, for example, an output having a characteristic the same as that of the threshold value represented in FIG. 7, and inputs the output to one of the input terminals of the comparator 5.

In this situation, the resistor RC has a resistance value that is one-digit to two-digit times as large as the resistance value of the second voltage dividing resistor RB. With such a configuration as described above, the basic output of the sensor output correction circuit 44 is determined by the voltage division ratio based on the first voltage dividing resistor RA and the second voltage dividing resistor RB; accordingly, even provided any one of the resistor RC and the thermistor RT fails and hence the additional-function fault occurs, the output does not change largely; thus, the effect at a time when the failure occurs can be reduced.

Based on a comparison between the output of the sensor output correction circuit 44 and the reference electric potential, which is a fixed value, the comparator 5 determines whether or not there exists an abnormality in the main circuit, and then inputs the result of the determination to the control circuit 6. When receiving a signal, from the comparator 5, that indicates the abnormality in the main circuit, the control circuit 6 stops the operation of the main circuit 2. When while the operation of the main circuit 2 is stopped in such a manner, the main circuit 2 recovers from the foregoing abnormality and becomes normal, the comparator 5 outputs a signal indicating the normality of the main circuit 2 to the control circuit 6; as a result, the control circuit 6 restarts the operation of the main circuit 2.

In Embodiment 5, the output of the input voltage sensor 3 is corrected by the sensor output correction circuit 44 in accordance with the ambient temperature; then, the corrected output of the input voltage sensor is compared with the reference value of the comparator 5, which is a fixed value. As a result, an effect the same as that of each of Embodiments 1 through 4 can be obtained.

In the present disclosure, various illustrative embodiments and examples are described; various features, modes, and functions disclosed in one or a plurality of embodiments are not limited to being applied to a specific embodiment but can be applied to embodiments separately or in various combinations. Therefore, numberless unillustrated variant examples are conceivable within the scope of the technology disclosed in the present disclosure. For example, there are included the case where at least one constituent element is modified, added, or omitted and the case where at least one constituent element is extracted and then combined with constituent elements of other embodiments.

What is claimed is:

1. An electric-power conversion apparatus comprising:
   a main circuit that operates in such a way as to drive a semiconductor switching device so as to perform electric-power conversion;
   a sensor that detects an electric quantity at a predetermined portion of the main circuit and then outputs an output corresponding to the detected electric quantity;
   a comparator that generates an output based on a comparison between the output of the sensor and a threshold value;
   a reference voltage circuit that produces the threshold value; and
   a control circuit that is configured in such a way as to stop operation of the main circuit, based on the output of the comparator,
   wherein the reference voltage circuit is configured in such a way as to change the threshold value in accordance with an ambient temperature under which the semiconductor switching device is laid,
   wherein the reference voltage circuit comprises a first voltage dividing resistor, a second voltage dividing resistor connected in series with the first voltage dividing resistor, a third resistor, and a thermistor connected in series with the third resistor, and
   wherein a series circuit consisting of the third resistor and the thermistor is connected in parallel with one of the first voltage dividing resistor and the second voltage dividing resistor, without being connected in parallel with the other one of the first voltage dividing resistor and the second voltage dividing resistor.

2. The electric-power conversion apparatus according to claim 1, wherein the electric quantity to be detected by the sensor is a voltage or an electric current.

3. The electric-power conversion apparatus according to claim 1,
   wherein the sensor is configured in such a way as to generate a negative-characteristic output for the electric quantity,
   wherein the thermistor has an NTC characteristic, and
   wherein the series circuit consisting of the third resistor and the thermistor is connected in parallel with the second voltage dividing resistor.

4. The electric-power conversion apparatus according to claim 3, wherein the third resistor connected in series with the thermistor has a resistance value that is one-digit to two-digit times as large as a resistance value of the second voltage dividing resistor.

5. The electric-power conversion apparatus according to claim 3, wherein the electric quantity to be detected by the sensor is a voltage or an electric current.

6. The electric-power conversion apparatus according to claim 1, wherein the sensor is configured in such a way as to generate a negative-characteristic output for the electric quantity, wherein the thermistor has a PTC characteristic, and wherein the series circuit consisting of the third resistor and the thermistor is connected in parallel with the first voltage dividing resistor.

7. The electric-power conversion apparatus according to claim 6, wherein the third resistor connected in series with the thermistor has a resistance value that is one-digit to two-digit times as large as a resistance value of the first voltage dividing resistor.

8. The electric-power conversion apparatus according to claim 6, wherein the electric quantity to be detected by the sensor is a voltage or an electric current.

9. The electric-power conversion apparatus according to claim 1, wherein the sensor is configured in such a way as to generate a positive-characteristic output for the electric quantity, wherein the thermistor has an NTC characteristic, and wherein the series circuit consisting of the third resistor and the thermistor is connected in parallel with the first voltage dividing resistor.

10. The electric-power conversion apparatus according to claim 9, wherein the third resistor connected in series with the thermistor has a resistance value that is one-digit to two-digit times as large as a resistance value of the first voltage dividing resistor.

11. The electric-power conversion apparatus according to claim 9, wherein the electric quantity to be detected by the sensor is a voltage or an electric current.

12. The electric-power conversion apparatus according to claim 1, wherein the sensor is configured in such a way as to generate a positive-characteristic output for the electric quantity, wherein the thermistor has a PTC characteristic, and wherein the series circuit consisting of the third resistor and the thermistor is connected in parallel with the second voltage dividing resistor.

13. The electric-power conversion apparatus according to claim 12, wherein the third resistor connected in series with the thermistor has a resistance value that is one-digit to two-digit times as large as a resistance value of the second voltage dividing resistor.

14. The electric-power conversion apparatus according to claim 12, wherein the electric quantity to be detected by the sensor is a voltage or an electric current.

15. An electric-power conversion apparatus comprising:

a main circuit that operates in such a way as to drive a semiconductor switching device so as to perform electric-power conversion;

a sensor that detects an electric quantity at a predetermined portion of the main circuit and then outputs an output corresponding to the detected electric quantity;

a sensor output correction circuit that corrects the output of the sensor;

a comparator that generates an output based on a comparison between the output of the sensor output correction circuit and a threshold value; and a control circuit that is configured in such a way as to stop operation of the main circuit, based on the output of the comparator, wherein the sensor output correction circuit is configured in such a way as to correct the output of the sensor in accordance with an ambient temperature under which the semiconductor switching device is laid, wherein the sensor output correction circuit comprises a first voltage dividing resistor, a second voltage dividing resistor connected in series with the first voltage dividing resistor, a third resistor, and a thermistor connected in series with the third resistor, and wherein a series circuit consisting of the third resistor and the thermistor is connected in parallel with one of the first voltage dividing resistor and the second voltage dividing resistor, without being connected in parallel with the other one of the first voltage dividing resistor and the second voltage dividing resistor.

16. The electric-power conversion apparatus according to claim 15, wherein the sensor is configured in such a way as to generate a positive-characteristic output for the electric quantity, wherein the thermistor has a PTC characteristic, and wherein the series circuit consisting of the resistor and the thermistor is connected in parallel with the second voltage dividing resistor.

* * * * *